United States Patent
Poppe

(10) Patent No.: US 6,474,361 B2
(45) Date of Patent: Nov. 5, 2002

(54) FLOATING WEIR ASSEMBLY AND FLUID FLOW MANAGEMENT SYSTEM COMPRISING SAME

(75) Inventor: Robert E. Poppe, Oklahoma City, OK (US)

(73) Assignee: Poppe Engineering, Inc., Oklahoma City, OK (US)

( * ) Notice: Subject to any disclaimer, the term of this patent is extended or adjusted under 35 U.S.C. 154(b) by 74 days.

(21) Appl. No.: 09/727,670

(22) Filed: Nov. 30, 2000

(65) Prior Publication Data

US 2002/0062871 A1 May 30, 2002

Related U.S. Application Data

(60) Provisional application No. 60/198,043, filed on Apr. 18, 2000.

(51) Int. Cl.[7] .............................. B65G 5/00; E21F 17/16; F17D 1/00
(52) U.S. Cl. .................. 137/578; 137/101.27; 137/236; 137/398; 137/559; 114/123; 114/256; 405/88; 405/96
(58) Field of Search ............................ 137/393, 101.27, 137/395, 396, 398, 558, 559, 236.1, 578; 114/256, 123; 405/88, 96

(56) References Cited

U.S. PATENT DOCUMENTS

| | | | |
|---|---|---|---|
| 930,903 A | * 8/1909 | Tucker | |
| 3,547,553 A | * 12/1970 | Stanfield | 415/7 |
| 3,757,953 A | * 9/1973 | Sky-Eagle, Jr. | 210/242.1 |
| 4,094,338 A | 6/1978 | Bauer | |
| 4,136,997 A | * 1/1979 | Chapman | 114/256 |
| 4,405,458 A | 9/1983 | McHugh, Jr. | |
| 4,431,536 A | * 2/1984 | Thompson | 210/123 |
| 4,628,960 A | * 12/1986 | Brickell et al. | 137/558 |
| 4,802,592 A | 2/1989 | Wessels | |
| 5,106,494 A | * 4/1992 | Norcross | 210/123 |

* cited by examiner

*Primary Examiner*—A. Michael Chambers
(74) *Attorney, Agent, or Firm*—Mary M. Lee

(57) ABSTRACT

A floating weir assembly for controlling the discharge of fluid from a fluid reservoir. The weir assembly includes a buoyant body preferably comprising a sidewall surrounding a central bottom opening. A weir is provided on the inside surface of the sidewall, and a gauge is provided on the opposite side of the sidewall's inside surface. The sidewall may provide a ballast chamber for holding ballast, such as sand. By adjusting the amount of the ballast, the depth to which the body is submerged can be varied. By distributing the sand circumferentially, the body can be leveled in the fluid to ensure accuracy of the weir. Because the sidewall is partially submerged, undesirable surface matter, such as oil and debris, is prevented from entering the weir. While there are many applications for this floating weir assembly, a preferred application is in the field of sewage treatment systems.

60 Claims, 4 Drawing Sheets

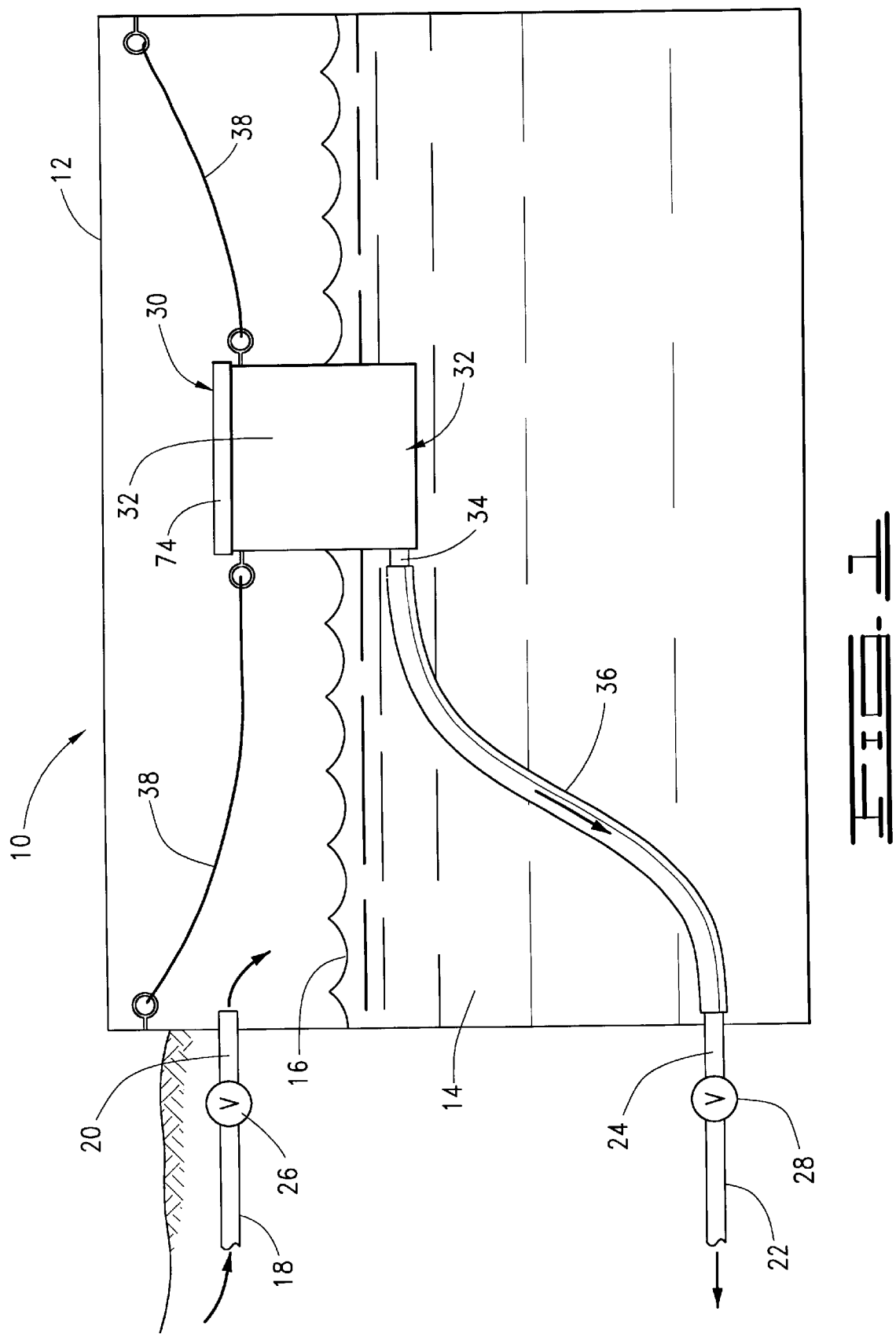

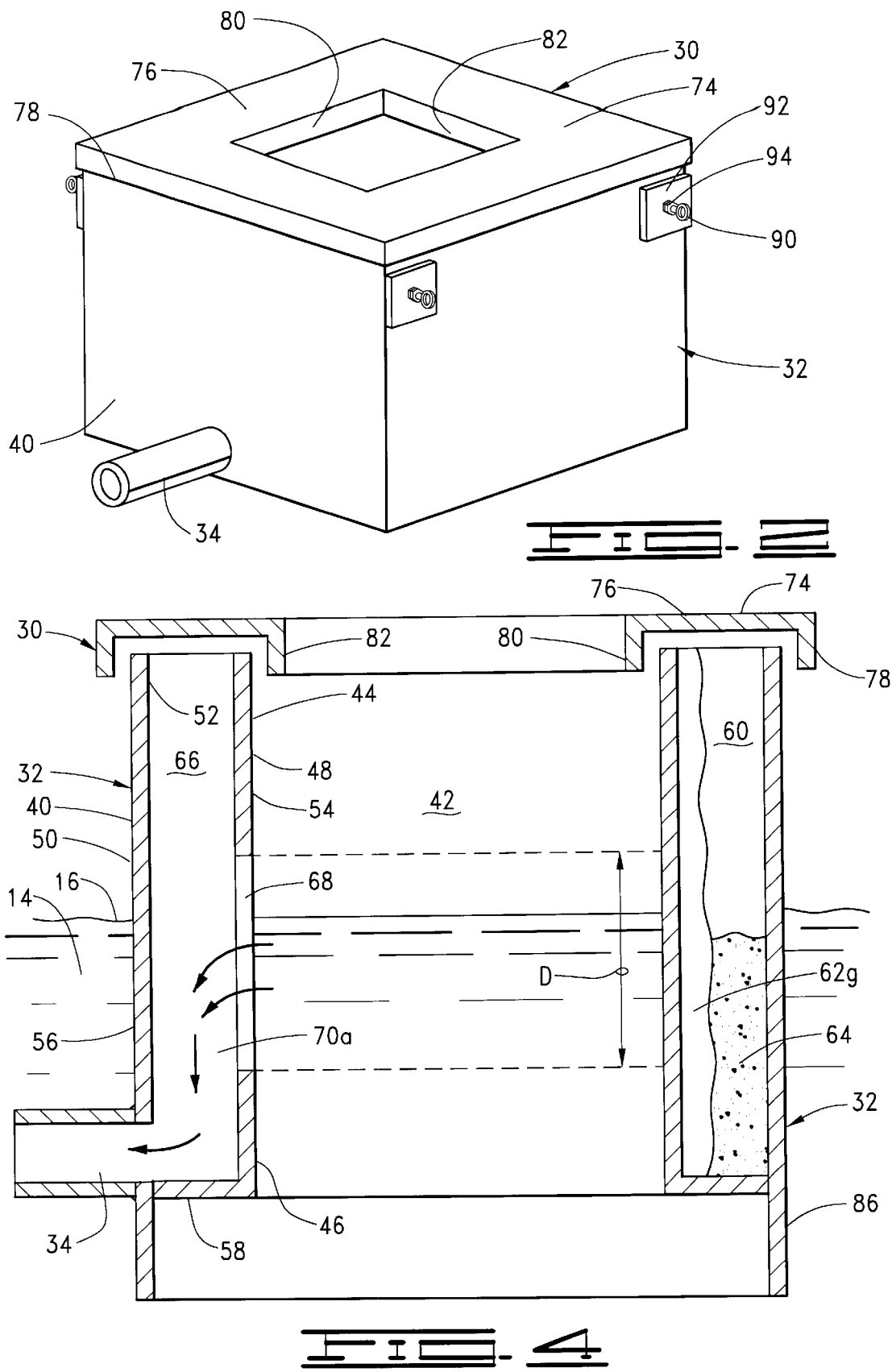

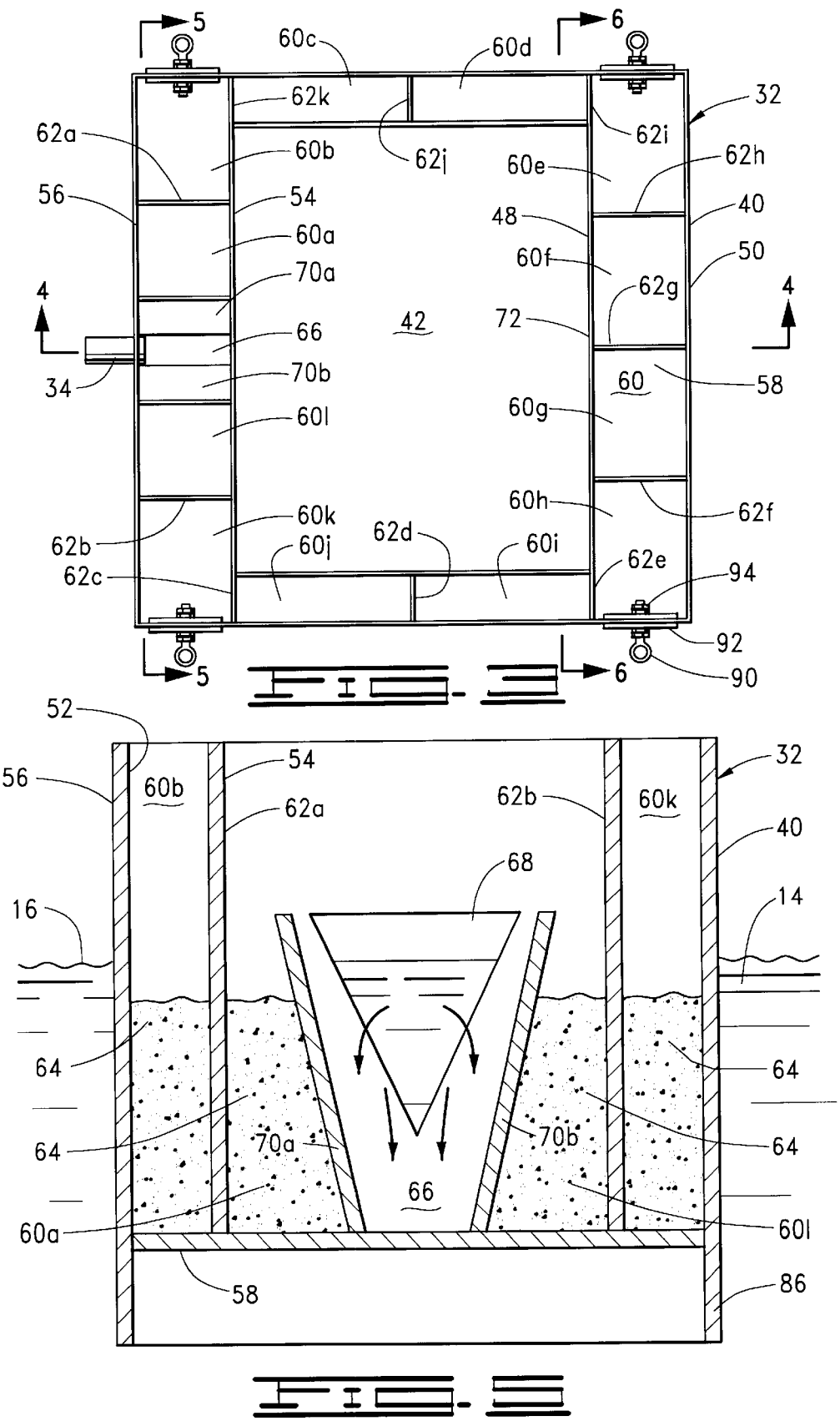

FLOATING WEIR ASSEMBLY AND FLUID FLOW MANAGEMENT SYSTEM COMPRISING SAME

CROSS-REFERENCE TO RELATED APPLICATIONS

This application claims priority to U.S. provisional application Ser. No. 60/198,043, filed Apr. 18, 2000, entitled "Floating Weir with Flow Control," which is incorporated herein by reference.

FIELD OF THE INVENTION

The present invention relates generally to devices for controlling the flow of fluid into a conduit from a body of fluid.

SUMMARY OF THE INVENTION

The present invention is directed to a weir assembly for maintaining a constant flow of fluid from a fluid reservoir having a fluid surface into a discharge conduit. The weir assembly comprises a body buoyantly supportable on the fluid surface. A weir is positioned in the body so that the intake rate of the weir varies with the depth of the body in the fluid when the weir assembly is operating in the fluid reservoir. An outlet in the body is positioned to direct fluid from the weir to the discharge conduit. The weir assembly includes adjustable ballast in the body adapted to maintain the body at a selected depth in the fluid reservoir.

The present invention further comprises a weir assembly for maintaining a constant flow of fluid from a fluid reservoir having a fluid surface into a discharge conduit. The weir assembly comprises a body buoyantly supportable on the fluid surface. A weir is positioned in the body to receive fluid at a selected rate from the vessel when the body is supported on the fluid surface in the reservoir. An outlet in the body is positioned to direct fluid from the weir to the discharge conduit. In this embodiment, the weir assembly includes a baffle on the body positioned to prevent surface matter from entering the weir.

In yet another aspect, the present invention comprises a fluid flow management system. The system comprises a reservoir of fluid having a fluid surface, a reservoir inlet for directing fluid into the reservoir, and a reservoir outlet for directing fluid out of the reservoir. A discharge conduit directs fluid to the reservoir outlet. The system further includes a weir assembly for controlling the rate at which fluid is discharged from the reservoir through the discharge conduit. The weir assembly first comprises a body buoyantly supportable on the fluid surface. A weir is positioned in the body so that the intake rate of the weir varies with the depth to which the body is submerged in the fluid. An outlet in the body is connected to the discharge conduit, and adjustable ballast in the body maintains the body partially submerged to a selected depth in the fluid.

In still another embodiment, the present invention is directed to a fluid flow management system comprising a reservoir of fluid having a fluid surface. The system includes a reservoir inlet for directing fluid into the reservoir and a reservoir outlet for directing fluid out of the reservoir. A discharge conduit directs fluid to the reservoir outlet. The system further includes a weir assembly for controlling the rate at which fluid is discharged from the reservoir through the discharge conduit. The weir assembly comprises a body buoyantly supportable on the fluid surface. A weir is positioned in the body to receive fluid at a selected rate from the vessel when the body is supported on the fluid surface in the reservoir. An outlet in the body is positioned to direct fluid from the weir to the discharge conduit. In this embodiment, the weir assembly includes a baffle on the body positioned to prevent surface matter from entering the weir when the body is operating in the reservoir.

BRIEF DESCRIPTION OF THE DRAWINGS

FIG. 1 is a schematic illustration of a fluid flow management system employing a weir assembly in accordance with the present invention.

FIG. 2 is a perspective view of the weir assembly of the present invention.

FIG. 3 is a plan view of the body of the weir assembly with the cover removed.

FIG. 4 is a side sectional view taken along line 4—4 of FIG. 3.

FIG. 5 is a side sectional view taken along line 5—5 of FIG. 3.

DETAILED DESCRIPTION OF THE PREFERRED EMBODIMENT

Figure 6:
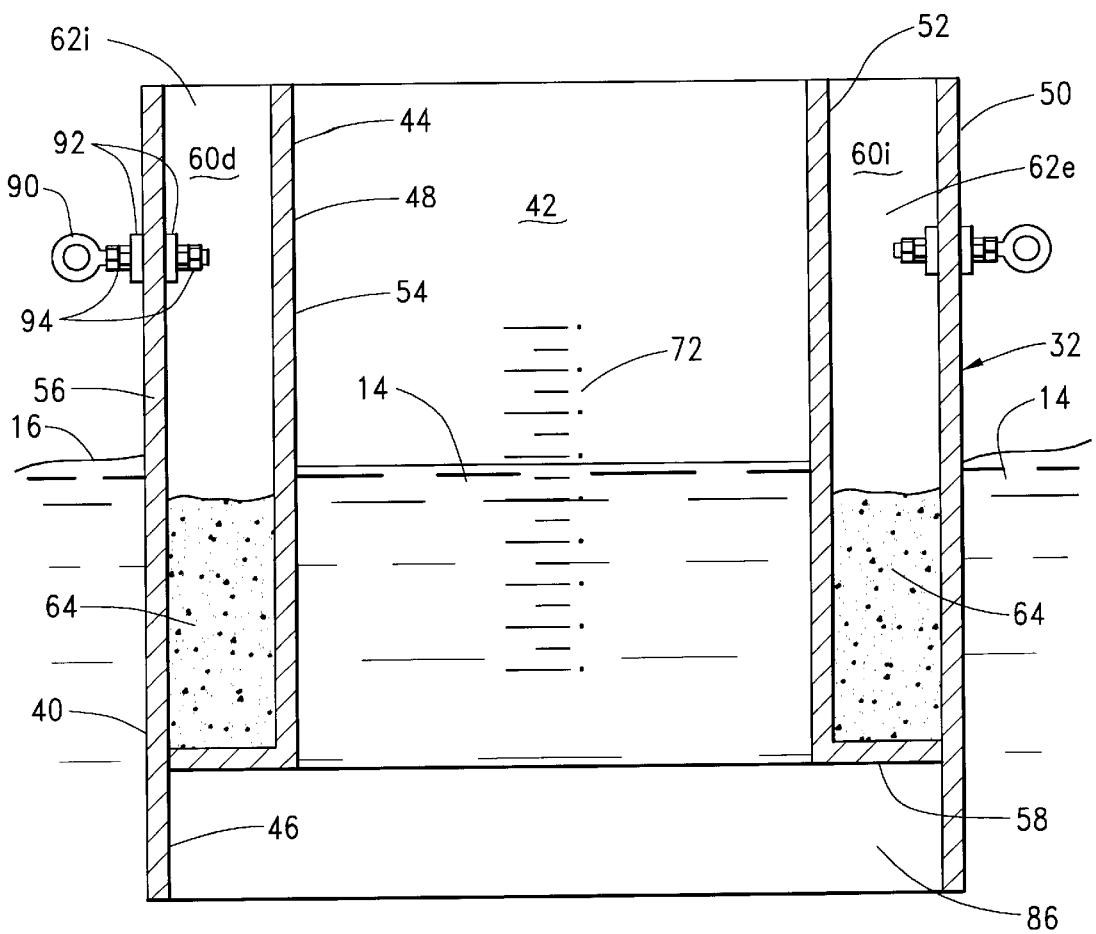
FIG. 6 is a side sectional view taken along line 6—6 of FIG. 3.

In many technical fields there is need to maintain a constant flow of fluid from a body or reservoir of fluid. Where there is a significant variation in the fluid level in the body of fluid, or a variation in the rate of incoming fluid, or both, it can be difficult to maintain a constant discharge rate.

In some applications, undesirable surface matter may be floating on the surface of the fluid. Solid matter, such as debris, twigs or leaves, can partially or completely obstruct the discharge outlet; oil or algae floating on the surface can adversely affect the content or quality of the discharge fluid. Thus, it is often advantageous to exclude surface matter from the effluent.

Waste or sewage treatment systems represent one ideal application of the present invention. In such systems, sanitary or raw sewage is accumulated in a reservoir or lagoon and treated biologically before being discharged to an open body of water, such as a stream or lake. The rate at which sewage is introduced into the reservoir may vary widely; for example, inflow typically increases during the day and during stormy weather, while inflow usually decreases at night. In addition, different types of solids and fluids accumulate in the reservoir; some float to the surface, while others settle to the bottom.

Government regulations limit the concentration of solids that may be reintroduced into the public water streams. Thus, in such systems, it is desirable to maintain a relatively constant discharge rate to prevent the discharge of unwanted surface matter.

The present invention provides a weir assembly that is simple to manufacture and easy to install and maintain. The weir assembly of this invention provides for easy and accurate adjustment of the weir intake and provides a relatively constant discharge rate. In addition, the preferred embodiment includes a baffle that prevents undesirable surface matter from entering the effluent. These and other advantages will be apparent from the following description.

With reference now to the drawings in general and to FIG. 1 in particular, there is shown therein a fluid flow management system designated generally by the reference numeral 10. While the present invention will be described in the context of a sewage treatment system, it is not to be construed as limited to such systems; rather, this invention would be equally applicable to many other fluid flow management systems.

The system 10 comprises a reservoir 12 for holding a body of fluid 14 and having a fluid surface 16. While the reservoir in a sewage treatment facility may be an open excavation or lagoon, the reservoir in the system of this invention could be any type of natural or man-made containment. As used herein, "fluid" is intended to refer to any flowable medium. The fluid usually will be a liquid, but the invention is not so limited.

Fluid 14 is introduced into the reservoir 12 through a supply line 18 that connects to a reservoir inlet 20 for directing fluid into the reservoir 12. In the case of a sewage treatment facility, the supply line retrieves fluid from the municipal sewage system and delivers it to the reservoir for treatment. The system 10 further comprises a discharge line 22 that connects to a reservoir outlet 24 for directing fluid out of the reservoir 12. In the case of a sewage facility, the discharge line conducts the treated fluid to a public water stream. In the preferred design, isolation valves 26 and 28 are provided on the supply line 18 and the discharge line 22.

With continuing reference to FIG. 1, the system 10 further comprises a weir assembly 30 for controlling the rate at which fluid 14 is discharged from the reservoir 12. The weir assembly 30 includes a body 32 buoyantly supportable on the fluid surface 16. The weir assembly 30 is provided with a weir, described hereafter, inside the body 32. The weir outputs to an outlet 34 in the body 32. The outlet 34 is connected to a discharge conduit 36, which directs fluid to the reservoir outlet 24. The discharge conduit 36 preferably is flexible hose. However, many other types of conduits may be employed instead. It will be appreciated that there may be more than one outlet and more than one conduit, depending on the output of the assembly.

The position of the weir assembly 30 preferably is stabilized in the reservoir 12, such as by steel cables 38 connected at one end to the reservoir and at the other end to the body 32. The cables 38 may be connected to the reservoir by any suitable device, such as mooring posts or the like. The cables 38 can be connected to the body 32 of the weir assembly 30 in a manner yet to be described.

Turning now to FIGS. 2–6, a preferred construction for the weir assembly 30 will be described. As best seen in FIG. 2, the weir body 32 preferably is generally cubic in shape. More particularly, the preferred body 32 comprises a sidewall 40 surrounding a central intake chamber 42 extending from a top opening 44 to a bottom opening 46 (see FIGS. 3–6). Thus, the sidewall 40 has an inside surface 48 and an outside surface 50.

The weir assembly 30 of the present invention preferably comprises an adjustable ballast system of some type adapted to maintain the body 32 partially submerged to a selected depth in the fluid 14. To that end, as shown in FIGS. 3–6, the sidewall 40 preferably comprises an open top 52, an inner wall 54, an outer wall 56 spaced a distance from the inner wall, and a bottom 58, all of which form a ballast chamber 60. More preferably, one or more partitions 62a–k are included to divide the ballast chamber 60 into subchambers 60a–l.

Referring still to FIGS. 3–6, the preferred adjustable ballast system comprises a ballast material. The preferred ballast material is a flowable medium, which may be liquid or solid particulate matter. For example, in the embodiment illustrated, sand 64 is utilized as a flowable ballast material. The depth to which the body 32 is submerged in the fluid 14 can be varied by varying the amount of the sand 64 in the ballast chamber 60; the more sand, the deeper the body is submerged. In addition, the body 32 can be leveled relative to the fluid surface 16 by distributing the sand 64 circumferentially in the different subchambers 60a–l; in other words, the ballast material can be configured to ensure that the body 32 and thus the weir inside it is level.

Between the partitions 62a and 62b is a collection chamber 66 between the inner and outer walls 54 and 56 for receiving fluid from the weir 68. As shown, the preferred form of weir for this embodiment is an inverted triangular opening in the inner wall 54. In other embodiments, especially those adapted for large discharge volumes, the weir may be rectangular.

The outlet 34 is positioned in the outer wall 56 to drain the collection chamber 66 into the discharge conduit 36 (see FIG. 1). Two slanted panels 70a and 70b may be provided between the inner and outer walls 54 and 56 to provide a funnel shape and define in part the collection chamber 66. The panels 70a and 70b also provide one of the walls which enclose the ballast subchambers 60a and 60l. Now it will be apparent that the weir is positioned in the body 32 so that the intake rate of the weir into the collection chamber 66 will vary with the depth to which the body is submerged in the fluid 14.

Figure 7:
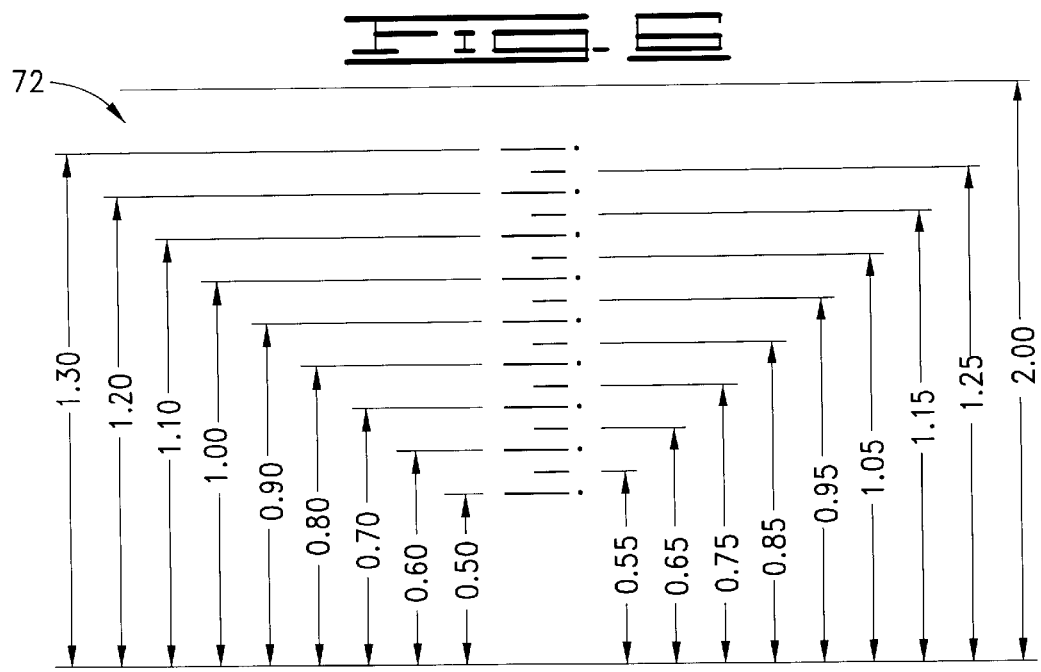
FIG. 7 is an enlarged view of the weir gauge.

With continued reference to FIGS. 3–6, the weir assembly 30 may also include a weir gauge 72. Preferably, the weir gauge 72 is a scale positioned on the inside surface 48 of the inner wall 54 opposite to and aligned with the weir 68, as shown best in FIGS. 4, 5 and 6. As indicated in FIG. 4, the vertical dimension of the gauge 72 and the weir 68 is indicated by the arrow "D." A suitable weir gauge 72 is illustrated with accompanying dimensions in FIG. 7.

In the preferred embodiment, the weir assembly 30 further comprises a cover 74. The cover 74 includes a top panel 76 with a depending outer edge 78 and a depending inner edge 80. In this shape, the cover 74 completely encloses the open top 52 of the collection chamber 66 and the ballast chamber 60, and has an opening 82 nearly coextensive with the top opening 44 of the central intake chamber 42 and opposite the bottom opening 46. For easy access to the ballast chamber 60, the cover 74 is removably attached to the body 32.

As shown and described in FIGS. 1 and 4–6, the weir assembly 30 is designed to float partially submerged in the fluid surface 16. The fluid 14 from the reservoir 12 enters the central intake chamber 42 through the bottom opening 46. In this way, the sidewall 40, which surrounds the intake chamber 42, acts as a baffle to prevent undesirable surface matter from entering the intake chamber and thus the weir 68. A skirt 86 depending from the sidewall 40 may be added to enhance the baffling function of the sidewall 40.

As indicated previously, the weir assembly 30 preferably is stabilized in a selected position in the reservoir 12 by cables 38 shown in FIG. 1. The cables preferably are removably attachable to the body 32. While many connecting devices can be used for this purpose, a simple connection means is provided by attaching eyebolts 90 to the sidewall 40 by means of anchor plates 92 and double nuts 94 on the inside and outside of the outer wall 56, as seen best in FIG. 3.

The procedure for installing the weir assembly 30 in a fluid reservoir now will be described with reference to FIG. 1. First, the isolation valve 26 on the supply line 18 is closed, and the fluid level in the reservoir 12 is lowered below the minimum operating level. Next, a reservoir outlet 24 is fixed in the wall of the reservoir and connected to the discharge line 22 with the isolation valve 28 shut off. The flexible discharge conduit 36 then is connected to the reservoir outlet 24 with the weir end exposed above the fluid level. The outlet 34 on the weir body 32 is then attached to the conduit 36. The cables 38 are attached to the weir body 32 at the eyebolts 90 and to the sides of the reservoir at the mooring posts or other connections. The isolation valve 26 on the supply line 18 is opened and fluid is added to the reservoir 12. When the operating depth is achieved, the isolation valve 28 is opened.

With the body 32 floating on the surface 16 of the fluid, ballast 64 (sand, water, pebbles, or any other sort of adjustable weighting material or object) is added to the ballast subchambers 60a–l in the sidewall 40, not including the collection chamber 66. Using a level on the top of the body 32, the ballast is adjusted circumferentially in the different subchambers to keep the top of the box level.

Ballast is added until the body 32 sinks to the fluid level associated with the selected discharge rate as determined by the weir gauge 72. Next, enough ballast is removed to equal the weight of the cover 74. The "coverless" gauge level should be noted for future reference. Finally, the cover 74 is replaced and the level of the body is verified again with the level on the top of the cover. During operation of the weir assembly 30, gauge level should be monitored and adjustments made to the ballast, as necessary, to maintain the desired depth and level.

The weir assembly of this invention can be installed in an existing sewage treatment facility utilizing a conventional outlet discharge box. In such a system, the discharge box typically has a fixed weir and a discharge pipe. To convert such a conventional system to a system in accordance with the present invention, a valve is installed on the discharge pipe between the outlet discharge box and the discharge line outlet. Then, the discharge conduit 36 from the weir assembly 30 (see FIG. 1) is connected to the discharge line 22. As in newly constructed systems, it is desirable to include an isolation valve in the discharge line 22 so that discharge fluid from the weir assembly can be interrupted for repair or maintenance. The discharge line 22 is connected to the existing discharge line below its new valve.

Now it will be appreciated that the weir assembly and fluid flow management system of the present invention is advantageous in many respects. The weir assembly is inexpensive to produce and simple to install and maintain. The weir assembly provides a relatively accurate weir intake regardless of the rate at which fluid is entering the reservoir or changes in the fluid level in the reservoir. The adjustable ballast system is self-contained and can be used to adjust both the level and the depth of the weir assembly in the fluid. The weir assembly is designed so that the weir intake occurs inside a baffled intake chamber surrounded by the sidewall of the weir body. In this way, surface debris and other undesirable surface matter floating at or near the fluid surface are prevented from entering the weir inside the intake chamber.

Changes can be made in the combination and arrangement of the various parts and elements described herein without departing from the spirit and scope of the invention as defined in the following claims.

What is claimed is:

1. A weir assembly for maintaining a selected discharge rate of fluid from a fluid reservoir having a fluid surface into a discharge conduit, the weir assembly comprising:

a body buoyantly supportable on the fluid surface;

a weir positioned in the body so that the intake discharge rate of the weir varies with the depth of the body in the fluid when the weir assembly is operating in the fluid reservoir;

a weir gauge supported in the body and adapted to display the discharge rate of the weir;

an outlet in the body positioned to direct fluid from the weir to the discharge conduit; and adjustable ballast in the body adapted to maintain the body at a selected depth in the fluid according to the weir gauge.

2. The weir assembly of claim 1 wherein the body comprises a sidewall surrounding an intake chamber, wherein the weir is positioned to receive fluid only through the intake chamber so that the sidewall prevents surface matter from entering the intake chamber, and wherein the outlet is positioned to drain fluid from the weir into the discharge conduit when the weir assembly is operating in the fluid reservoir.

3. The weir assembly of claim 1 wherein the body comprises a sidewall surrounding an intake chamber with an open bottom so that the sidewall baffles the fluid entering the intake chamber to prevent surface matter on the fluid surface from entering the intake chamber, wherein the sidewall of the body comprises an inner wall, an outer wall spaced a distance from the inner wall, and a bottom to form a ballast chamber and a collection chamber, wherein the collection chamber is arranged to direct fluid from the weir to the outlet, wherein the adjustable ballast comprises ballast material, and wherein the ballast chamber is sized and positioned to contain variable amounts of ballast material whereby the depth of the body in the surface of the fluid can be varied by varying the amount and position of the ballast material in the ballast chamber and whereby the body can be leveled.

4. The weir assembly of claim 3 wherein a skirt depends from the sidewall of the body to further baffle surface matter from entering the open bottom of the intake chamber.

5. The weir assembly of claim 3 wherein the sidewall has an open top and wherein the weir assembly further comprises a cover removably attachable to the body to cover the open top of the sidewall.

6. The weir assembly of claim 5 wherein the cover has an opening generally opposite the open bottom of the intake chamber of the body.

7. The weir assembly of claim 3 wherein the ballast chamber is divided into subchambers by at least one partition whereby the ballast material can be distributed circumferentially to level the body as well as adjust the depth of the body.

8. The weir assembly of claim 3 wherein the weir comprises an opening in the inner wall of the sidewall.

9. The weir assembly of claim 8 wherein the weir gauge is positioned on the inside surface of the inner wall of the sidewall opposite the weir.

10. The weir assembly of claim 1 wherein the adjustable ballast comprises ballast material, wherein the body comprises a sidewall defining a ballast chamber sized and positioned to contain variable amounts of ballast material whereby the depth of the body in the surface of the fluid in the reservoir can be varied and the body can be leveled by varying the amount and position of the ballast material in the ballast chamber.

11. The weir assembly of claim 10 wherein the ballast material is sand.

12. A weir assembly for maintaining a selected discharge rate of fluid from a fluid reservoir having a fluid surface into a discharge conduit, the weir assembly comprising:

a body buoyantly supportable on the fluid surface;

a weir positioned in the body to receive fluid at a selected discharge rate from the reservoir when the body is supported on the fluid surface in the reservoir;

a weir gauge supported in the body and adapted to display the discharge rate of the weir;

an outlet in the body positioned to direct fluid from the weir to the discharge conduit; and wherein the body comprises a baffle positioned to prevent surface matter from entering the weir when the body is supported on the fluid surface in the reservoir.

13. The weir assembly of claim 12 wherein the body comprises a sidewall surrounding an intake chamber having an open bottom in fluid communication with the fluid in the reservoir beneath the fluid surface, and wherein the weir is positioned in the sidewall to receive fluid through the open bottom of the body when the weir assembly is supported on the fluid surface of the reservoir, and wherein the baffle is formed at least partially by the sidewall.

14. The weir assembly of claim 13 wherein the baffle further comprises a skirt depending from the sidewall.

15. The weir assembly of claim 13 wherein the sidewall of the body comprises an inner wall, an outer wall spaced a distance from the inner wall, and a bottom to form a collection chamber, wherein the weir is an opening in the inner wall continuous with the collection chamber, wherein the outlet is positioned to conduct fluid from the collection chamber to the discharge conduit, and wherein the collection chamber is arranged to direct fluid from the weir to the outlet when the weir assembly is operating on the fluid surface of the reservoir.

16. The weir assembly of claim 15 wherein the baffle further comprises a skirt depending from the sidewall.

17. The weir assembly of claim 15 wherein the weir is an opening in the inner wall of the sidewall.

18. The weir assembly of claim 17 wherein the weir gauge is positioned on the inside surface of the inner wall of the sidewall opposite to and aligned with the weir.

19. The weir assembly of claim 18 wherein the baffle further comprises a skirt depending from the sidewall.

20. A fluid flow management system, comprising:

a reservoir of fluid having a fluid surface;

a reservoir inlet for directing fluid into the reservoir;

a reservoir outlet for directing fluid out of the reservoir;

a discharge conduit for directing fluid to the reservoir outlet; and a weir assembly for maintaining a selected discharge rate from the reservoir through the discharge conduit, wherein the weir assembly comprises:

a body buoyantly supportable on the fluid surface;

a weir positioned in the body so that the discharge rate of the weir varies with the depth to which the body is submerged in the fluid;

a weir gauge supported in the body and adapted to display the discharge rate of the weir;

an outlet in the body connected to the discharge conduit; and adjustable ballast in the body adapted to maintain the body partially submerged to a selected depth in the fluid according to the weir gauge.

21. The system of claim 20 wherein the body of the weir assembly comprises a sidewall surrounding an intake chamber, wherein the weir is positioned to receive fluid only through the intake chamber so that the sidewall baffles surface matter from the fluid in the intake chamber, and wherein the outlet is positioned to drain fluid from the weir into the discharge conduit when the weir assembly is operating in the fluid reservoir.

22. The weir assembly of claim 20 wherein the body of the weir assembly comprises a sidewall surrounding an intake chamber having an open bottom, wherein the sidewall of the body comprises an inner wall, an outer wall spaced a distance from the inner wall, and a bottom to form a ballast chamber and a collection chamber, wherein the collection chamber is arranged to direct fluid from the weir to the weir outlet, wherein the adjustable ballast comprises ballast material, and wherein the ballast chamber is sized and positioned to contain variable amounts of ballast material whereby the depth to which the body is submerged in the surface of the fluid can be varied and the body can be leveled by varying the amount of the ballast material in the ballast chamber.

23. The system of claim 22 wherein a skirt depends from the sidewall of the body to further baffle surface matter from entering the open bottom of the body.

24. The system of claim 22 wherein the sidewall has an open top and wherein the weir assembly further comprises a cover removably attachable to the body to cover the open top of the sidewall.

25. The system of claim 24 herein the cover has an opening generally opposite the open bottom of the body.

26. The system of claim 22 wherein the weir comprises an opening in the inner wall of the sidewall.

27. The system of claim 26 wherein the weir gauge is positioned on the inside surface of the inner wall of the sidewall opposite to and aligned with the weir.

28. The system of claim 22 wherein the ballast chamber is divided into subchambers by at least one partition whereby the ballast material can be distributed circumferentially to level the body and to adjust the depth of the body.

29. The system of claim 20 wherein the adjustable ballast comprises ballast material, wherein the body comprises a sidewall defining a ballast chamber sized and positioned to contain variable amounts of ballast material whereby the depth to which the body is submerged in the surface of the fluid in the reservoir can be varied and the body can be leveled by varying the amount of the ballast material in the ballast chamber.

30. The system of claim 29 wherein the ballast material is sand.

31. A fluid flow management system, comprising:

a reservoir of fluid having a fluid surface;

a reservoir inlet for directing fluid into the reservoir;

a reservoir outlet for directing fluid out of the reservoir;

a discharge conduit for directing fluid to the reservoir outlet; and a weir assembly for maintaining a selected discharge rate from the reservoir through the discharge conduit, wherein the weir assembly, comprises:

a body buoyantly supportable on the fluid surface;

a weir positioned in the body so that the discharge rate of the weir varies with the depth to which the body is submerged in the fluid;

a weir gauge supported in the body and adapted to display the discharge rate of the weir;

an outlet in the body positioned to direct fluid from the weir to the discharge conduit; and wherein the body comprises a baffle positioned to prevent surface matter from entering the weir.

32. The system of claim 31 wherein the body comprises a sidewall surrounding an intake chamber having an open bottom in fluid communication with the fluid in the reservoir beneath the fluid surface, wherein the weir is positioned in the sidewall to receive fluid through the open bottom of the body, and wherein the baffle is formed at least partially by the sidewall.

33. The system of claim 32 wherein the baffle further comprises a skirt depending from the sidewall.

34. The system of claim 32 wherein the sidewall of the body comprises an inner wall, an outer wall spaced a distance from the inner wall, and a bottom to form a collection chamber, wherein the weir is an opening in the inner wall continuous with the collection chamber, wherein the outlet is positioned to conduct fluid from the collection chamber to the discharge conduit, and wherein the collection chamber is arranged to direct fluid from the weir to the outlet.

35. The system of claim 34 wherein the baffle further comprises a skirt depending from the sidewall.

36. The system of claim 34 wherein the weir is an in the inner wall of the sidewall.

37. The system of claim 36 wherein the weir gauge is positioned on the inside surface of the inner wall of the sidewall opposite to and aligned with the weir.

38. The system of claim 37 wherein the baffle of the weir assembly further comprises a skirt depending from the sidewall.

39. A weir assembly for maintaining a selected discharge rate of fluid from a fluid reservoir having a fluid surface into a discharge conduit, the weir assembly comprising:
 a body buoyantly supportable on the fluid surface;
 a weir positioned in the body so that the discharge rate of the weir varies with the depth of the body in the fluid when the weir assembly is operating in the fluid reservoir;
 an outlet in the body positioned to direct fluid from the weir to the discharge conduit;
 adjustable ballast in the body adapted to maintain the body at a selected depth in the fluid;
 wherein the body comprises a sidewall surrounding an intake chamber with an open bottom so that the sidewall baffles the fluid entering the intake chamber to prevent surface matter on the fluid surface from entering the intake chamber, wherein the sidewall of the body comprises an inner wall, an outer wall spaced a distance from the inner wall, and a bottom to form a ballast chamber and a collection chamber;
 wherein the collection chamber is arranged to direct fluid from the weir to the outlet;
 wherein the adjustable ballast comprises ballast material; and
 wherein the ballast chamber is sized and positioned to contain variable amounts of ballast material whereby the depth of the body in the surface of the fluid can be varied by varying the amount and position of the ballast material in the ballast chamber and whereby the body can be leveled.

40. The weir assembly of claim 39 wherein a skirt depends from the sidewall of the body to further baffle surface matter from entering the open bottom of the intake chamber.

41. The weir assembly of claim 39 wherein the sidewall has an open top and wherein the weir assembly further comprises a cover removably attachable to the body to cover the open top of the sidewall.

42. The weir assembly of claim 41 wherein the cover has an opening generally opposite the open bottom of the intake chamber of the body.

43. The weir assembly of claim 39 wherein the ballast chamber is divided into subchambers by at least one partition whereby the ballast material can be distributed circumferentially to level the body as well as adjust the depth of the body.

44. The weir assembly of claim 39 wherein the weir comprises an opening in the inner wall of the sidewall.

45. The weir assembly of claim 44 wherein the weir assembly further comprises a weir gauge adapted to display the discharge rate of the weir.

46. The weir assembly of claim 45 wherein the weir gauge is positioned on the inside surface of the inner wall of the sidewall opposite the weir.

47. A fluid flow management system, comprising:
 a reservoir of fluid having a fluid surface;
 a reservoir inlet for directing fluid into the reservoir;
 a reservoir outlet for directing fluid out of the reservoir;
 a discharge conduit for directing fluid to the reservoir outlet; and
 a weir assembly for maintaining a selected discharge rate from the reservoir through the discharge conduit, wherein the weir assembly comprises:
 a body buoyantly supportable on the fluid surface;
 a weir positioned in the body so that the intake rate of the weir varies with the depth to which the body is submerged in the fluid;
 an outlet in the body connected to the discharge conduit;
 adjustable ballast in the body adapted to maintain the body partially submerged to a selected depth in the fluid;
 wherein the body of the weir assembly comprises a sidewall surrounding an intake chamber having an open bottom, wherein the sidewall of the body comprises an inner wall, an outer wall spaced a distance from the inner wall, and a bottom to form a ballast chamber and a collection chamber;
 wherein the collection chamber is arranged to direct fluid from the weir to the weir outlet; and
 wherein the adjustable ballast comprises ballast material, and wherein the ballast chamber is sized and positioned to contain variable amounts of ballast material whereby the depth to which the body is submerged in the surface of the fluid can be varied and the body can be leveled by varying the amount of the ballast material in the ballast chamber.

48. The system of claim 47 wherein a skirt depends from the sidewall of the body to further baffle surface matter from entering the open bottom of the body.

49. The system of claim 47 wherein the sidewall has an open top and wherein the weir assembly further comprises a cover removably attachable to the body to cover the open top of the sidewall.

50. The system of claim 49 wherein the cover has an opening generally opposite the open bottom of the body.

51. The system of claim 47 wherein the ballast chamber is divided into subchambers by at least one partition whereby the ballast material can be distributed circumferentially to level the body and to adjust the depth of the body.

52. The system of claim 47 wherein the weir comprises an opening in the inner wall of the sidewall.

53. The system of claim 52 wherein the weir assembly further comprises a weir gauge adapted to display the discharge rate of the weir.

54. The system of claim 53 wherein the weir gauge is positioned on the inside surface of the inner wall of the sidewall opposite to and aligned with the weir.

55. A fluid flow management system, comprising:
- a reservoir of fluid having a fluid surface;
- a reservoir inlet for directing fluid into the reservoir;
- a reservoir outlet for directing fluid out of the reservoir;
- a discharge conduit for directing fluid to the reservoir outlet; and
- a weir assembly for maintaining a selected discharge rate from the reservoir through the discharge conduit, wherein the weir assembly comprises:
  - a body buoyantly supportable on the fluid surface;
  - a weir positioned in the body so that the discharge rate of the weir varies with the depth to which the body is submerged in the fluid;
  - an outlet in the body connected to the discharge conduit;
  - adjustable ballast in the body adapted to maintain the body partially submerged to a selected depth in the fluid;
  - wherein the adjustable ballast comprises ballast material; and
  - wherein the body comprises a sidewall defining a ballast chamber sized and positioned to contain variable amounts of ballast material whereby the depth to which the body is submerged in the surface of the fluid in the reservoir can be varied and the body can be leveled by varying the amount of the ballast material in the ballast chamber.

56. The system of claim 55 wherein the ballast material is sand.

57. A weir assembly for maintaining a selected discharge rate of fluid from a fluid reservoir having a fluid surface into a discharge conduit, the weir assembly comprising:
- a body buoyantly supportable on the fluid surface;
- a weir positioned in the body, the weir being adjustable relative to the level of the fluid surface whereby the discharge rate of the weir assembly is controlled by positioning the weir;
- an outlet in the body positioned to direct fluid from the weir to the discharge conduit; and
- wherein the body comprises a solid sidewall defining an intake chamber with an intake opening, wherein the sidewall is configured so that the intake opening is a distance below the fluid surface when the weir assembly is supported on the fluid surface, so that the fluid from the reservoir enters the weir only through the intake opening, and so that the sidewall baffles the fluid entering the intake chamber to prevent surface matter on the fluid surface from entering the intake chamber.

58. The weir assembly of claim 57 further comprising a weir gauge adapted to display the intake rate of the weir.

59. The weir assembly of claim 57 wherein the weir is formed in the sidewall forming the intake chamber, wherein the weir assembly further comprises adjustable ballast adapted to maintain the body partially submerged to a selected depth whereby the intake rate of the weir is varied.

60. The weir assembly of claim 59 wherein the adjustable ballast comprises flowable ballast material, wherein the body comprises a sidewall defining a ballast chamber sized and positioned to contain variable amounts of the flowable ballast material whereby the depth to which the body is submerged in the surface of the fluid in the reservoir can be varied and the body can be leveled by varying the amount and position of the ballast material in the ballast chamber.

* * * * *